United States Patent [19]

Hahn et al.

[11] 4,206,989
[45] Jun. 10, 1980

[54] FILM CHANGER PLATFORM FOR A SHEET FILM CAMERA

[75] Inventors: Alfred Hahn; Arthur Gall, both of Erlangen; Wolfgang Jäger, Neunkirchen, all of Fed. Rep. of Germany

[73] Assignee: Siemens Aktiengesellschaft, Berlin & Munich, Fed. Rep. of Germany

[21] Appl. No.: 922,796

[22] Filed: Jul. 7, 1978

[30] Foreign Application Priority Data

Jul. 27, 1977 [DE] Fed. Rep. of Germany ....... 2733947

[51] Int. Cl.² .............................................. C03B 19/10
[52] U.S. Cl. ..................................... 354/182; 250/468
[58] Field of Search ..................... 354/75, 76, 81, 174, 354/182; 40/79; 250/468, 470, 471

[56] References Cited

U.S. PATENT DOCUMENTS

| | | | |
|---|---|---|---|
| 1,033,834 | 7/1912 | Shukis | 354/182 |
| 1,052,029 | 2/1913 | Bander | 354/182 |
| 2,483,872 | 10/1949 | Bensen | 354/182 |
| 2,602,386 | 7/1952 | Brigham et al. | 354/182 |
| 2,617,218 | 11/1952 | Antos | 40/79 |
| 3,377,727 | 4/1968 | Weggeland | 40/79 |
| 3,962,584 | 6/1976 | Munch | 250/468 |
| 4,089,017 | 5/1978 | Buldini | 354/174 |
| 4,114,166 | 9/1978 | Driscoll et al. | 354/76 |

FOREIGN PATENT DOCUMENTS 247886  3/1910  Fed. Rep. of Germany ........... 354/182
2123209 11/1972 Fed. Rep. of Germany ........... 354/182

*Primary Examiner*—L. T. Hix
*Assistant Examiner*—Alan Mathews
*Attorney, Agent, or Firm*—Hill, Van Santen, Steadman, Chiara & Simpson

[57] ABSTRACT

The supply magazine and the collector magazine are arranged on opposite sides of the camera exposure station, with a transport conveying one film sheet in each instance via a removal slot of the supply magazine. The transport is coupled with a slide which is movable parallel to the film plane between the supply magazine and the camera exposure station. There is coupled to the slide a tang which conveys the film sheet disposed in the exposure station into the collector magazine. The illustrated sheet film camera is adapted to use in medical examination apparatus, and particularly for rapid sequence recording of images displayed on a fluorescent screen.

9 Claims, 3 Drawing Figures

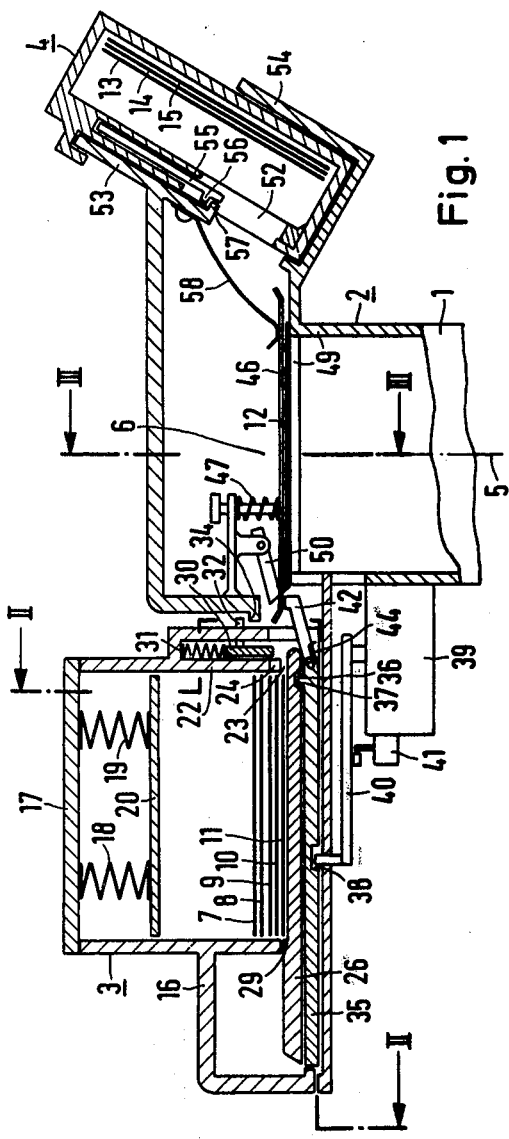
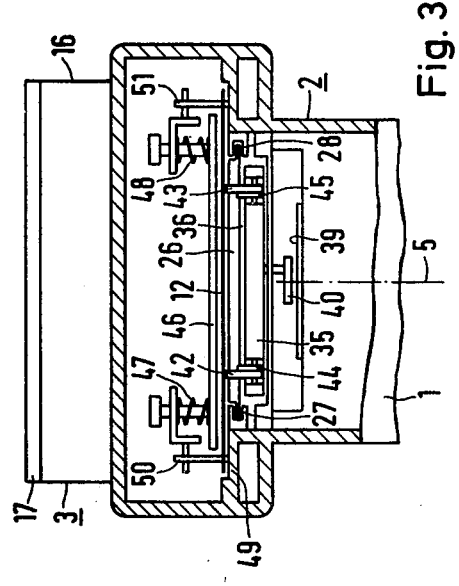
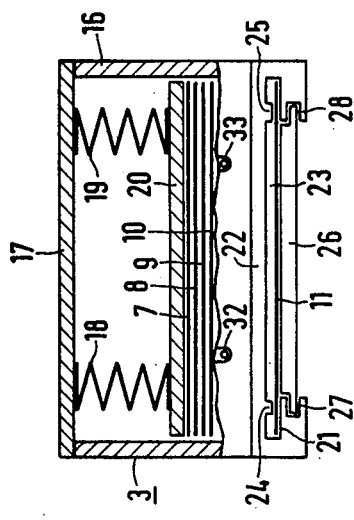
Fig. 1
Fig. 2
Fig. 3

FILM CHANGER PLATFORM FOR A SHEET FILM CAMERA

BACKGROUND OF THE INVENTION

The invention relates to a film changer platform for a sheet film camera comprising a camera exposure station centered relative to the optical axis of the sheet film camera for the exposure of the film sheets, as well as comprising a supply magazine for the unexposed film sheets, and a collector magazine for the exposed film sheets.

From the German Letters Pat. No. 2,123,209 it is known, in the case of x-ray examination apparatus, to utilize supply magazines for sheet films wherein a stack of unexposed film sheets lies on a slide admitted in the base of the supply magazine, and which slide is movable in the film plane. During the working stroke of the slide, the lowest film sheet bearing directly against the slide is seized by two projecting hooks of said slide and, with its oppositely disposed edge, is shifted through a removal slot in the lateral wall of the magazine in the plane of this film sheet. With this supply magazine, it is possible to remove individual film sheets from a stack of film sheets, and to slide them individually between the transport rollers, or the transport bands, of x-ray examination apparatus.

In view of the TV-display apparatus used in medical technology in the case of an increasing number of types of examinations, such as, for example, that used for display of ultrasonic images and computer tomographs, and in view of the image intensifier-television installations increasingly used in x-ray technology, there exists a considerable requirement to photographically record the data illustrated on the fluorescent screen.

SUMMARY OF THE INVENTION

Accordingly, the object underlying the invention consists in developing an optical photographic exposure installation which permits large-format film-sheets to be individually exposed in rapid sequence. This photographic exposure installation should be as simple as possible to operate and capable of being produced as economically as possible. Due to the high degree of image definition required in the medical field, the object should also be to utilize larger film formats.

Accordingly, in accordance with the invention, in a film changer platform of the type initially cited, the supply magazine and the collector magazine are arranged on opposite sides of the camera exposure station, a transport means, conveying one film sheet in each instance via a removal slot of the supply magazine is capable of being coupled with a slide movable parallel to the film plane between the supply magazine and the camera exposure station; there is coupled, to the front edge of the slide, facing the collector magazine, at least one tang which can be brought into engagement with the rear edge (with respect to the transport direction) of the film sheet located in the camera exposure station, and the exposure station is provided with at least one retaining catch element for engaging behind this rear edge of the film sheet inserted in the exposure station. A film changer platform such as this utilizes the transport means which are required anyway, in the case of a supply magazine comprising a sheet film separation device, for the further transport of the exposed film sheets disposed in a camera exposure station. The intermittently driven transport cylinders otherwise effecting the film transport into and out of the exposure station have been economically dispensed with here. The film transport proceeds here by means of the drive mechanism necessary anyway for the sheet separation in the supply magazine. Only two additional tangs and retaining catches are required in order to also achieve the arresting of the film sheet in the exposure station and in order to achieve a compulsory transport for the exposed film sheet, already disposed in the exposure station, into the collector magazine. The outlay for the film changer platform is thereby reduced to a minimum.

In an expedient embodiment of the invention, a base plate for the removal of the film sheet directly resting thereon, such base plate being aligned parallel to the film plane, and forming a limiting edge of the removal slot in the lateral wall of the supply magazine, may be provided with a step or shoulder projecting by approximately eight tenths (0.8) of the film thickness, and aligned parallel to the removal slot, the shoulder being engageable with the rear edge of the film sheets. This purely linear forward and backward movement of the base plate, utilized as the transport means, necessary in this type of film sheet separation, may be directly coupled with the slide of the film changer platform.

The operational reliability of the film changer may be further increased if, in an inventive further embodiment of the invention, there is arranged directly beyond the removal slot of the supply magazine, a contact pressure plate for the film sheets extending to the region of the camera exposure station. A contact pressure plate such as this not only ensures that the film sheets will be disposed in the camera exposure station in a planar fashion, but it also prevents the film sheet to be inserted from buckling during the stroke of the base plate, as the step or shoulder of the base plate emerges from the removal slot, said film sheet thus coming out of engagement with this step or shoulder.

In a further inventive embodiment of the invention, a spring metal plate, elastically bearing against the respective film sheet, may be allocated to the edge or marginal region of the camera exposure station. It is thereby guaranteed in the simplest manner that the film will not slide further over the camera exposure station than is required by the stroke of the base plate of the supply magazine. At the same time, the readiness-for-use or operability of the film changer platform is thus rendered possible even in the case of working positions which markedly deviate from the horizontal position.

The conveyance of the previously exposed film sheet disposed in the camera exposure station into the collector magazine is significantly facilitated if the collector magazine, at its side not facing the camera exposure station, is tilted up more than 30° in relation to the plane of the camera exposure station and if it manifests, on its upper or proximal side, an insert opening aligned relative to the film plane for the exposed film sheets. It thereby becomes possible to slide the film sheet, initially moved in a straight line from the camera exposure station by the tangs of the slide, directly into the collector magazine, and to convey the film sheet onto any film sheets already stored therein.

Further details of the invention shall be explained in greater detail on the basis of a sample embodiment illustrated in the accompanying sheet of drawings; and other objects, features and advantages will be apparent from this detailed disclosure and from the appended claims.

BRIEF DESCRIPTION OF THE DRAWINGS

FIG. 1 illustrates a longitudinal section of the film changer platform of the sheet film camera;

FIG. 2 illustrates a section along the line II—II of FIG. 1; and

FIG. 3 illustrates a section along the line III—III of FIG. 1.

DETAILED DESCRIPTION

In FIG. 1, a film changer platform 2, connected to the housing of a sheet film camera 1, and a supply magazine 3, placed on the film changer platform, and a collector magazine 4 can be recognized. Between the supply and the collector magazines, there is disposed the camera exposure station 6, centered relative to the optical axis 5 of the sheet film camera, in which the film sheets 7 through 15 are exposed.

As FIG. 2 illustrates, supply magazine 3 consists essentially of a rectangular housing 16 which is adapted in its interior dimensions to the dimensions of the film sheets which are to be inserted. The cover 17 of the supply magazine is connected via springs 18, 19, to a contact pressure plate 20. The latter projects into the interior of housing 16 of supply magazine 3, and is pressed, by springs 18, 19, against the inserted stack of film sheets 7, 8, 9, 10, 11 (in FIG. 1, the contact pressure plate is not shown as bearing against the film sheets for the sake of clarity). The stack of film sheets bears against the base 21 (FIG. 2) of supply magazine 3. On the side at which the film sheets are removed from the supply magazine, the one lateral wall 22 of the supply magazine 3 is milled out in a slot-shaped manner in the width of the film sheets directly above the base of the supply magazine, such that the film sheets can be slid through the removal slot 23 thus formed. The lateral wall is provided in the slot region with two extensions 24, 25 (FIG. 2), which project downward to a point approximately one and five tenths (1.5) times film-thickness, above the base 21 of supply magazine 3. The clearance gap should have a dimension in the range from about 1.1 to about 1.9 times the film thickness. The center section of base 21 of supply magazine 3 is mounted in the housing 16 of the supply magazine in the form of a base plate 26 in the plane of the film sheet resting thereagainst such that said base plate 26 can be moved beneath the removal slot and through said slot. To this end, base plate 26 is mounted in guides 27, 28 (FIG. 2) which are milled into the remaining edges of the base. The base plate 26, on its side facing the film sheets, possesses a step or shoulder 29 rising approximately eight tenths (0.8) of the film thickness above the adjacent film support surface. In the extreme retracted position of base plate 26 wherein the latter is entirely retracted into the supply magazine 3, the step or shoulder 29 engages behind the rear edge of the film sheets in the supply magazine. As can be recognized in FIG. 1, the supply magazine, on the side of the removal slot 23, is provided with a light-tight closing plate 30 which is pressed down by a spring 31 onto the base 21 (FIG. 2) of the supply magazine. The closing plate has two pins 32, 33 (FIGS. 1 and 2) extending through the housing which, during emplacement on the film changer platform, are automatically brought into engagement with a stop 34 provided on the film changer platform 2 to lift the plate 30 and open the slot 23.

In the film changer platform 2, a slide 35 from the camera exposure station 6 is mounted such that it is reciprocally movable beneath the supply magazine 3 placed thereon. The slide is provided with a lug 36 which is engageable in a corresponding notch 37 of the base plate 26 of supply magazine 3. In addition, on its opposite side, it bears a transverse slot 38 into which a crank arm 40, driven by a motor 39, engages. In a position wherein slide 35 is inserted entirely beneath supply magazine 3, crank arm 40 actuates a cam switch 41 via which motor 39 can be switched off. At its front edge (with respect to the transport direction) slide 35 bears two tangs 42, 43 (FIGS. 1 and 3) which are connected with slide 35 in an articulated fashion and, via one small torsion spring 44, 45, each, are held pressed against the underside of a contact pressure plate 46 for the film sheets, said contact pressure plate covering the camera exposure station. Contact pressure plate 46 is pressed, via two pressure springs 47, 48, against the film sheet disposed in the camera exposure station and against the frame 49 of the camera exposure station 6. Moreover, two retaining catch elements 50, 51 (FIGS. 1 and 3), are associated with the camera exposure station 6, which are mounted such that they engage behind the rear edge of the film sheets transported into the camera exposure station. These retaining catches 50, 51 are beveled on the edge facing the supply magazine such that they are pressed up by the unexposed film sheet transported into the camera exposure station 6.

The collector magazine 4 is provided on the upper side with an insert opening 52. It is inserted in guides 53, 54, on the film changer platform 2, which hold it in an angled or tilted position forming an oblique angle of approximately 60° measured in counterclockwise direction from the plane of the camera exposure station 6. The oblique angle should be at least 30° (measured in a counterclockwise direction). Its position is thus aligned relative to the film plane in the camera exposure station such that the lower edge of the insert opening 52 lies approximately in the film plane of the camera exposure station. The insert opening can be closed with the cover 55. This cover bears a limit stop lug 56 which, as the collector magazine 4 is inserted into the film changer platform 2, is slid open by a cooperating limit stop 57.

In its initial position, in the switched-off state, slide 35 of film changer platform 2 is in an extreme retracted position beneath supply magazine 3 (as shown in FIG. 1). Upon emplacement of the supply magazine on the film changer platform, lug 36 of slide 35 couples with a notch 37 in the base plate 26 of the supply magazine 3. At the same time, during emplacement of the supply magazine, the pins 32, 33, of the closing plate 30 are pressed up by limit stop 34 of the supply magazine, and the closing plate is thereby pushed back counter to the force of spring 31. The removal slot 23 of the supply magazine is thus opened. Upon insertion of collector magazine 4 into the corresponding guides 53, 54, of the film changer platform 2, the limit stop lug 56 of the cover 55 is pushed open by the limit stop 57 of the film changer platform 2.

If the film changer platform is switched on; i.e., if motor 39 with the crank mechanism is put into motion, the crank arm 40 pushes slide 35 and, due to the coupling, also the base plate 26, from its extreme retracted position beneath the supply magazine 3 into the camera exposure station 6, and again back into its initial position where the cam switch 41 again stops the motor 39. During the movement of the base plate 26, the lowest film sheet 11, directly bearing against the base plate, of the stack of film sheets, is entrained by step or shoulder 29 on the rear side of base plate 26, out through the removal slot 23, and beneath the contact pressure plate 46 of the camera exposure station 6. A second film sheet which may have been also entrained would be held back by the two extensions 24, 25 (FIG. 2), in the removal slot 23. During the stroke of slide 35, tangs 42, 43, of the slide, which are pressed against the underside of the contact pressure plate 46 by means of their torsion springs 44, 45, push the film sheet therein which is still disposed in the camera exposure station, through the insert opening 52 of the collector magazine 4. The film sheet thus pushed out of the camera exposure station is placed onto the stack of film sheets 13, 14, 15, possibly already stored in the collector magazine 4. Pursuant to advancement of base plate 26 in the direction of the camera exposure station 6, the remaining film sheets lie in the supply magazine on the upper plane surface behind step or shoulder 29 of the base plate 26 (which surface extends rearwardly from the shoulder 29) and on the edges of the base 21 (FIG. 2) of the supply magazine 3. During the return stroke of the slide 35 and the base plate 26, the base plate can accordingly again slide beneath the stack of film sheets. The new film sheet pushed into the camera exposure station 6, cannot return during the return stroke of the base plate 26, on account of the retaining catches 50, 51, engaging the rear edge of the film sheet. It is, at the same time, held securely in place by the contact pressure plate 46 which presses it in the marginal region against the frame 49 (FIGS. 1 and 3) of the camera exposure station 6. This function can also be achieved by means of separate spring plates 58, illustrated in FIG. 1 (only one illustrated), pressing the forward edge of the film sheet 12 against the frame 49 of the camera exposure station.

During each full rotation of the crank arm 40 (shown only diagrammatically in FIG. 1), the rotation is controlled by the cam switch 41 so that an unexposed film sheet is conveyed from supply magazine 3 into the camera exposure station, and, simultaneously, the film sheet previously exposed in the camera exposure station is conveyed into the collector magazine 4. The filled collector magazine, as well as the emptied supply magazine, if necessary, may be removed at any time in daylight, since they immediately close (or seal) in a light-tight fashion by means of the closing plate 30, and the cover 55, respectively, as soon as they are removed from their operating position at the film changer platform 2. The cam switch 41 for the control of the crank arm 40 can also simultaneously control the initiation (or triggering) of the photographic exposure.

The upper plane surface of base plate 26 which is to the left of shoulder 29 as viewed in FIG. 1 has a rearward extent at least corresponding to the stroke length of the base plate 26 (i.e., the stroke required to move sheet 11 to the position of sheet 12 as seen in FIG. 1) minus the length of the sheets in the stroke direction.

It will be apparent that many modifications and variations may be effected without departing from the scope of the novel concepts and teachings of the present invention.

I claim as my invention:

1. A film changer platform for a sheet film camera, comprising a camera exposure station for the exposure of the film sheets, said station being centered relative to the optical axis of the sheet film camera, as well as comprising a supply magazine for the unexposed film sheets, and comprising a collector magazine for the exposed film sheets, the supply magazine (3) and the collector magazine (4) being arranged on opposite sides of the camera exposure station (6), a transport means (26) being movable in a removal direction for conveying one film sheet in each instance via a removal slot (23) of the supply magazine, a slide (35) capable of being coupled to the transport means (26) for shifting the transport means (26) and being movable parallel to the film plane between the supply magazine and the camera exposure station, at least one tang (42, 43) coupled to the front edge of the slide and capable of being brought into engagement with the rear edge of the film sheet (12) disposed in the camera exposure station, and that the camera exposure station being provided with at least one retaining catch element (50, 51) for engaging behind this rear edge of the film sheet inserted in the camera exposure station, characterized in that the transport means comprises a base plate (26), aligned parallel to the film plane, forming a limiting edge of the removal slot (23) in the lateral wall of the supply magazine (3) for the purpose of removal of the film sheet directly resting against said base plate, said base plate (26) being provided with a shoulder (29) protruding by approximately eight-tenths of the film thickness, aligned parallel to the removal slot, and associated with the rear edge of the film sheets.

2. A film changer platform according to claim 1, characterized in that an upper plane surface of the shoulder (29) extends rearwardly by more than an amount derived from the stroke length minus the sheet film length in stroke direction.

3. A film changer platform according to claim 1, characterized in that the movable base plate (26) of the supply magazine (3) extends over only one portion of the entire width of the base (21) of the supply magazine.

4. A film changer platform for a sheet film camera, comprising a camera exposure station for the exposure of the film sheets, said station being centered relative to the optical axis of the sheet film camera, as well as comprising a supply magazine for the unexposed film sheets, and comprising a collector magazine for the exposed film sheets, the supply magazine (3) and the collector magazine (4) being arranged on opposite sides of the camera exposure station (6), a transport means (26) being movable in a removal direction for conveying one film sheet in each instance via a removal slot (23) of the supply magazine, a slide (35) capable of being coupled to the transport means (26) for shifting the transport means (26) and being movable parallel to the film plane between the supply magazine and the camera exposure station, at least one tang (42, 43) coupled to the front edge of the slide and capable of being brought into engagement with the rear edge of the film sheet (12) disposed in the camera exposure station, and that the camera exposure station being provided with at least one retaining catch element (50, 51) for engaging behind this rear edge of the film sheet inserted in the camera exposure station, characterized in that the collector magazine (4), at its side not facing the camera exposure station (6), is tilted up more than 30° relative to the plane of the camera exposure station, and manifests on its proximal side an insert opening (52) for the exposured film sheets which is aligned relative to the film plane.

5. A film changer platform for a sheet film camera, comprising a camera exposure station for the exposure of the film sheets, said station being centered relative to the optical axis of the sheet film camera, as well as comprising a supply magazine for the unexposed film sheets, and comprising a collector magazine for the exposed film sheets, the supply magazine (3) and the collector magazine (4) being arranged on opposite sides of the camera exposure station (6), a transport means (26) being movable in a removal direction for conveying one film sheet in each instance via a removal slot (23) of the supply magazine, a slide (35) capable of being coupled to the transport means (26) for shifting the transport means (26) and being movable parallel to the film plane between the supply magazine and the camera exposure station, tang means (42, 43) coupled to the front edge of the slide and capable of being brought into engagement with the rear edge of the film sheet (12) disposed in the camera exposure station, and that the camera exposure station being provided with at least one retaining catch element (50, 51) for engaging behind this rear edge of the film sheet inserted in the camera exposure station, said tang means being operable for moving a single film sheet by itself from said exposure station into said collector magazine solely by engagement with the rear edge of the film sheet itself, whereby the film sheet is transported without the use of a frame therefor and without any drive rollers.

6. A film changer platform according to claim 5, characterized in that, in the transport direction of the film sheets, directly beyond the removal slot (23) of the supply magazine (3), there is arranged a contact pressure plate (46) for the film sheets extending into the region of the camera exposure station (6).

7. A film changer platform according to claim 5, characterized in that there is associated with the marginal region of the camera exposure station (6) a spring plate (58) for elastically engaging against the respective film sheet.

8. A film changer platform according to claim 5, characterized in that the edge of the removal slot (23), opposite the base (21) of the supply magazine (3), bears two rectangular extensions (24, 25) projecting into the slot-region, the spatial intervals of these extensions from the base being in the range from 1.1 to 1.9 times the film thickness.

9. A film changer platform according to claim 5, characterized in that the collector magazine (4) is arranged to receive successive single film sheets in succession from the tang means, successively one on top of the other so that the tang means supplies each single film sheet onto the top of a stack of previously supplied film sheets in said collector magazine.

* * * * *